Dec. 10, 1940.  W. H. SICKINGER  2,224,552
COOKING OVEN AND HEAT CONTROL THEREFOR
Filed March 2, 1938
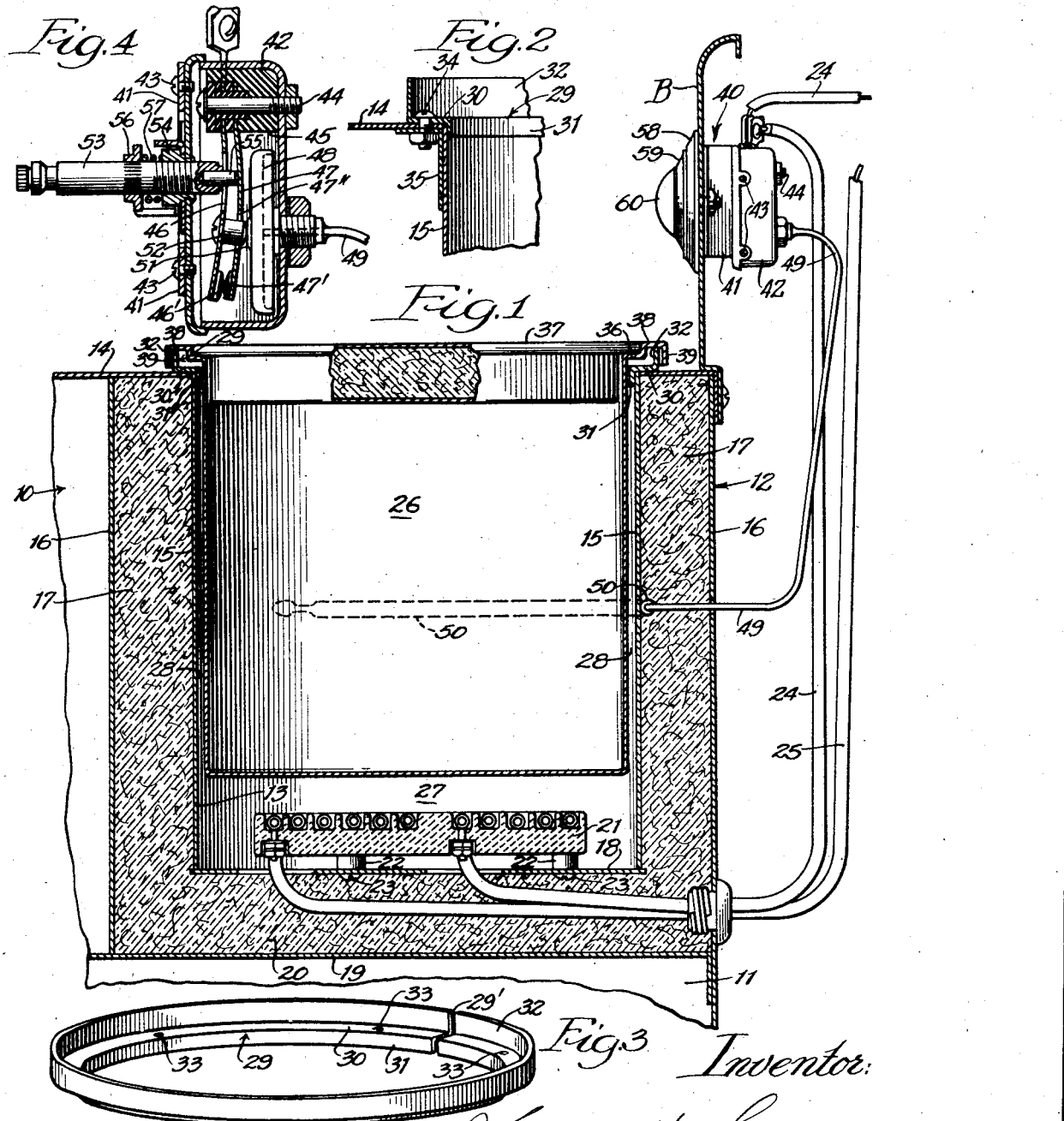

Patented Dec. 10, 1940

2,224,552

UNITED STATES PATENT OFFICE 2,224,552

COOKING OVEN AND HEAT CONTROL THEREFOR

William H. Sickinger, Chicago, Ill., assignor to Crown Stove Works, Cicero, Ill., a corporation of Illinois Application March 2, 1938, Serial No. 193,386

2 Claims. (Cl. 219—35)

This invention relates to the art of cooking stoves and ranges, and more particularly to oven structures. In the evolution of modern stoves and ranges, particularly those of the electric type, a comparatively recent new feature has been developed consisting in what is known in the trade as a "thrift" oven. This consists of a small cooking chamber or oven that is located directly over the main oven of the stove and takes the form of a sort of well, usually of circular cross-section, that opens through the top plate of the stove and is equipped with a heater at its bottom. Suspended within this chamber or well is a portable cooking vessel in the general form of a pail or bucket of sufficiently less external diameter than the internal diameter of the chamber to provide a narrow annular space surrounding the vessel that is filled by the hot air and gases rising from the heater. In this cooking vessel may be placed small roasts, stews, soups and other articles of food that can be cooked therein in less time and with a less expenditure of heat than if they were cooked in the large main oven or over the usual burners in the top plate of the stove. From this fact it derives its apt name of "thrift" oven.

One purpose or object of this invention has been to render an auxiliary or "thrift" oven of this character more reliable and useful for performing its intended function by equipping it with an improved device for automatically interrupting the further supply of heat when a maximum predetermined heat has been reached in the cooking chamber.

Another object has been to provide in association with such an auxiliary or "thrift" oven an improved manually operable means by which the heat regulator can be adjusted to interrupt the supply of heat at various temperatures according to the maximum degree of heat that may be used to cook any given article of food without danger of scorching or burning.

An illustrative embodiment of the invention is shown in the accompanying drawing, in which—

Figure 1 is a vertical section of an upper corner portion of a stove, showing the "thrift" oven and its cooking vessel in axial vertical section therein, and the heat control device in side elevation.

Fig. 2 is an enlarged fragmentary vertical section through the upper portion of the cooking chamber, showing a device for securing thereto a ring that supports and centers the cooking vessel in the cooking chamber.

Fig. 3 is a perspective detail of the supporting and centering ring above referred to.

Fig. 4 is a vertical section through the rear section of the heat control device shown in Fig. 1, showing the heater circuit switch and its adjusting means.

In the drawing there is shown at 10 an upper rear corner fragment of a stove structure, wherein is located directly over the main oven, indicated at 11, an auxiliary or so-called "thrift" oven designated generally by 12. The cooking chamber of this "thrift" oven takes the general form of a well 13 formed by heat insulated side and bottom walls and opening through the top plate 14 of the stove. The side walls preferably and as shown comprise inner and outer sheet metal linings 15 and 16 with a filling of rock wool, asbestos, or other similar insulation 17; and the bottom wall is similarly constructed comprising inner and outer sheet metal linings 18 and 19 respectively with a filling 20 of the same insulating material. Mounted in the bottom of the oven 13 is an electric heater 21 supported on the bottom wall by feet 22 that are preferably attached, as by screws 23, to the inner lining 18. Circuit lines 24 and 25 from a source of current lead into the heater 21, as shown.

26 designates a cooking vessel having the general form of an ordinary bucket or pail, and of a height and diameter sufficiently less than the internal height and diameter of the chamber 13 to provide a space 27 between its bottom and the heater 21 and a narrow annular space 28 between the opposed side walls of the vessel and chamber and communicating with the space 27. This cooking vessel 26 is obviously readily insertible and removable through the open top of the cooking chamber 13. The cooking vessel 26 is preferably suspended in the cooking chamber by a construction which both centers the vessel in the chamber and also provides a heat seal for the upper end of the heating space 28. To these ends, I provide a ring designated as a whole by 29 of the form shown in perspective in Fig. 3 and in cross-section in Fig. 2, this ring comprising an intermediate horizontal web 30, an internal depending flange 31, and an external upstanding flange 32. The web 30 is formed with holes 33 for the passage of bolts 34 by which it is secured, through the stove top plate 14 to underlying angle brackets 35 spot welded to the inner wall lining 15. The inner flange 31 fits within the upper end of the chamber 13 thus centering the ring 29, which latter is preferably split, as shown at 29' in Fig. 3 to accommodate small variations in the diameter of the inner lining 15 of the cooking chamber.

The upper end of the cooking vessel 26 is formed with a counter-sunk seat 36 for an insulated cover 37, and with an outwardly extending rim 38 that rests on the top edge of the ring flange 32, and a depending flange 39 that fits over and around the upstanding flange 32 of the ring 29. The engagement of the rim 38 with the top edge of the flange 32 forms a heat seal for the space 28, while the flange 39 co-operates with the flange 32 to center the cooking vessel in the cooking chamber.

Turning now to an important feature of the invention which comprises the application of a heat control to the "thrift" chamber, 40 designates as an entirety an automatic device that may be mounted on a rear instrument board B of the stove, and includes a thermally opened switch in the circuit of the heater 21 that is operated by a heat responsive member subjected to the mean temperature of the oven 13. The casing comprises front and rear sections 41 and 42 separably connected by bolts 43. In the rear section 42 is mounted on a screw 44 an insulating block 45 in which are secured a pair of spring switch arms 46 and 47 carrying contacts 46' and 47' respectively. This switch device is interposed in one of the motor circuit lines 24, 25. The switch arms 46 and 47 are so biased that normally the contacts 46' and 47' are closed, as shown in Fig. 4, the heater circuit 24, 25 being, of course, opened by the usual manual switch on the stove. Mounted on the rear wall of the casing 42 is a hollow thermal head designated as a whole by 48 that is filled with a heat expansible liquid, such as mercury, the chamber of the head 48 being in communication through a capillary tube 49 with a heat conducting tube 50 also filled with the same expansible liquid. This tube 50 is embedded in the insulation 17 and is curved to partly embrace and lie in contact with the inner lining 15 of the cooking chamber. On the center of the head 48 is a protuberance 51 which bears on the inner end of a stud 52 that is attached to the switch arm 46 and extends through a hole or slot 47'' in the switch arm 47. When the heat in the cooking chamber reaches a predetermined maximum, the contacts 46' and 47' are separated, and the circuit of the heater is opened until the temperature falls to a point that allows the automatic closing of the contacts 46', 47'.

This automatic heat control also includes a simple device by which the oven temperature at which the switch will be opened may be varied. This consists of a threaded stud 53 screwed through a fixed nut 54 in the inner wall of the casing 42 and carrying on its inner end a pin 55 of insulating material bearing against the switch arm 47. By turning the stud 53 the set of the contact 47' relatively to that of the contact 46' may be varied, so that the interruption of the heater circuit will occur at higher or lower oven temperatures. To prevent easy or accidental turning of the adjusting stud 53, the latter is equipped with a collar 56 fast thereon and a thrust spring 57 between said collar and the nut 54, which creates friction between the threads of the stud and the nut.

To the front face of the instrument board B is secured an escutcheon ring 58, in which is removably mounted, as by a screw-threaded joint, the holding ring 59 of a glass window 60 that covers the outer end of the stud 53. Behind this window is a small signal lamp (not shown) that may be so connected to the main heater circuit as to either go on or off when the heater circuit is opened. This signal feature is old and forms no part of the present invention.

From the foregoing it will be seen that the application of this automatic heat control to the "thrift" oven of a stove or range spells a further economy in the use of such oven by providing an automatic device that prevents overcooking or burning of the food and the waste of heat involved therein.

Variations and modifications of the structural details may be resorted to within the scope of the claims.

I claim:

1. In a stove of the class described, the combination with a stove top and an instrument board thereon, of an auxiliary oven having heat insulated side and bottom walls having metal internal linings and open at its upper end through said stove top, an electric heater mounted on the bottom wall of said oven, a portable cooking vessel insertible and removable through the open top of said oven, and an automatic heat control device, including a casing mounted on said instrument board, a pair of spring arms carrying normally closed heater circuit contacts in said casing, a hollow expansible thermal head in said casing, a stud on one of said spring arms in contact with said head, a heat conducting tube in contact with the side wall lining of said oven, a capillary tube connecting said heat conducting tube with said head, and a heat expansible liquid filling said head and tubes.

2. In a stove of the class described, the combination with a stove top and an instrument board thereon, of an auxiliary oven having heat insulated side and bottom walls having metal internal linings and open at its upper end through said stove top, an electric heater mounted on the bottom wall of said oven, a portable cooking vessel insertible and removable through the open top of said oven, and an automatic heat control device, including a casing mounted on said instrument board, a pair of spring arms carrying normally closed heater circuit contacts in said casing, a hollow expansible thermal head in said casing, a stud on one of said spring arms in contact with said head, a heat conducting tube in contact with the side wall lining of said oven, a capillary tube connecting said heat conducting tube with said head, a heat expansible liquid filling said head and tubes, and manually operable means mounted in said casing for adjusting the position of one of said spring arms whereby said contacts will be separated under a greater or less expanding movement of said head.

WILLIAM H. SICKINGER.